(12) United States Patent
Richard

(10) Patent No.: US 7,007,557 B1
(45) Date of Patent: Mar. 7, 2006

(54) FLOW SCALE HAVING A HINGEDLY SUSPENDED IMPACT PLATE

(75) Inventor: Clarence Richard, Minnetonka, MN (US)

(73) Assignee: Clarence Richard Services, Inc., Minnetonka, MN (US)

( * ) Notice: Subject to any disclaimer, the term of this patent is extended or adjusted under 35 U.S.C. 154(b) by 59 days.

(21) Appl. No.: 10/854,398

(22) Filed: May 26, 2004

(51) Int. Cl.
*G01F 1/28* (2006.01)
(52) U.S. Cl. .................................. 73/861.74; 73/861.77
(58) Field of Classification Search ...................... None
See application file for complete search history.

(56) References Cited

U.S. PATENT DOCUMENTS

| | | | |
|---|---|---|---|
| 3,611,803 A | | 10/1971 | Kajiura et al. |
| 3,640,135 A | | 2/1972 | Tomiyasu et al. |
| 4,157,661 A | | 6/1979 | Schindel |
| 4,440,029 A | | 4/1984 | Tomiyasu et al. |
| 4,718,285 A | | 1/1988 | Pfeiffer |
| 4,768,387 A | * | 9/1988 | Kemp et al. ............. 73/861.73 |
| 5,065,632 A | * | 11/1991 | Reuter ..................... 73/861.73 |
| 5,335,554 A | | 8/1994 | Kempf et al. |
| 5,698,794 A | * | 12/1997 | Bussian .................... 73/861.73 |
| 5,798,466 A | | 8/1998 | Satake et al. |
| 6,616,527 B1 | * | 9/2003 | Shinners et al. ............... 460/6 |

OTHER PUBLICATIONS

Millflo Dry Solids FlowMeter; Instruction Manual, Siemens Milltronics Process Instruments Inc./ Mar. 2001; 13 pgs.

* cited by examiner

*Primary Examiner*—Harshad Patel
(74) *Attorney, Agent, or Firm*—Kinney & Lange, P.A.

(57) ABSTRACT

An impact flow scale includes a first tube, disposed substantially vertically a second tube, disposed with a downward inclination and having an inlet at an upper end thereof and a lower end of the second tube connected to the first tube, where the first and second tubes permit material communication therebetween. The impact flow scale also includes an impact plate that is hingedly suspended at or near an upper end of the first tube. A material flow path is defined from the second tube through the first tube. The impact plate is adjustably positioned in the material flow path such that materials moving along the material flow path are capable of contacting the impact plate. A sensor disposed outside the first tube is operably connected to the impact plate, thus permitting detection of a horizontal force component generated as materials move along the material flow path.

25 Claims, 6 Drawing Sheets

FLOW SCALE HAVING A HINGEDLY SUSPENDED IMPACT PLATE

BACKGROUND OF THE INVENTION

The present invention relates generally to flow scales for sensing the flow of solid materials. More particularly, the present invention relates to a flow scale of a type using an impact plate for sensing the flow of materials directed against the impact plate.

In a variety of applications, it is frequently desirable to measure characteristics of a flow of solid materials, such as granular and powdered materials, without significantly interrupting the flow. Flow scale designs are known that incorporate an impact plate disposed substantially vertically, such as Tomiyasu et al., U.S. Pat. No. 3,640,135. The flow of solid materials is directed against the impact plate whereupon a horizontal force component exerted upon the impact plate is detected. When combined with weight data from another scale, information such as the flow rate and the weight of solid materials displaced can be determined.

Flow scales are often used under adverse environmental conditions. For example, flow scales are often used in environments with a high dust content, which hinders operation of mechanical and other sensitive components of the flow scale. Material buildup on or around mechanical components of the flow scale, such as at a mechanical support for the impact plate, may produce undesirable hysterisis effects that reduce sensitivity and accuracy of the flow scale.

Moreover, flow scales are also often used under unfavorable thermal conditions. As one example, hot baghouse dust may be present where flow scales are used in measuring paving mixes, and the heat from the hot baghouse dust may be transmitted (e.g., by conduction) to sensitive components of the flow scale. In addition, hot corrosive gasses may be present near the sensing device, due to material flow through the flow scale. Sensing devices like load cells are highly sensitive to high temperatures and corrosion, which can hinder or prevent proper functioning of the load cells and thus the flow scale.

Thus, the present invention relates to an impact flow scale that addresses problems with prior art designs.

BRIEF SUMMARY OF THE INVENTION

The present invention relates to an impact flow scale that includes a first tube, a second tube, an impact plate, mounting means and securing means. The first tube is disposed substantially vertically while the second tube is disposed with a downward inclination. The second tube has an inlet at its upper end, and has its lower end connected to the first tube. The mounting means hingedly suspends the impact plate at or near an upper end of the first tube such that the impact plate extends within the first tube. A material flow path is defined from the second tube through the first tube. The impact plate is adjustably positioned in the material flow path such that materials moving along the material flow path are capable of contacting the impact plate. The sensing means is disposed outside the first tube and is operably connected to the impact plate to permit detection of a horizontal force component generated as materials move along the material flow path.

DETAILED DESCRIPTION

Figure 1:
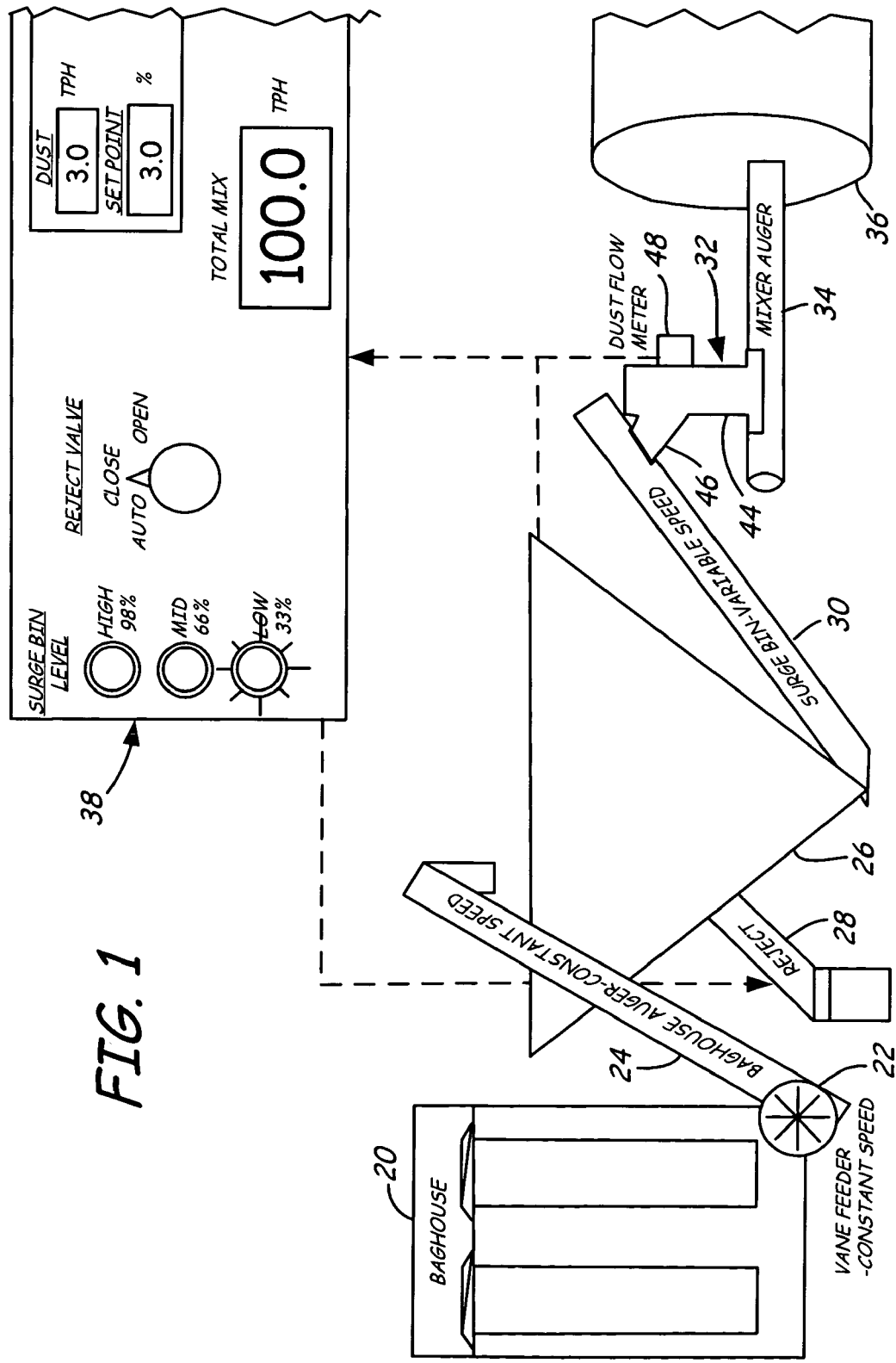
FIG. 1 is a simplified schematic representation of an exemplary dust flow system including a flow scale of the present invention.

FIG. 1 is a simplified schematic view of an exemplary dust flow system that includes a baghouse 20, a constant speed vane feeder 22, a constant speed baghouse auger 24, a surge bin 26, a reject valve 28, a variable speed surge bin auger 30, a dust flow scale 32, a mixer auger 34, a mix bin 36, and a control panel 38. The dust flow scale 32 includes a first tube 44, a second tube 46, and a housing 48.

The first tube 44 of the flow scale 32 is generally disposed substantially vertically. In a preferred embodiment, the first tube has a generally square cross section. In further embodiments, the first tube may have other shapes, such as having a circular cross section. The second tube 46 is connected to the first tube 44, permitting material communication therebetween. The second tube 46 is generally disposed at an incline, with a lower and or lower portion attached to the first tube 44. The housing 48 is attached to the first tube 44. Typically, the housing 48 is disposed opposite the second tube 46.

In operation, solid materials stored in the baghouse 20 are transported using the constant speed vane feeder 22 and the constant speed baghouse auger 24 to the surge bin 26. The surge bin, in one embodiment, provides an output to the control panel 38 indicating a level (e.g., high, mid, or low). A reject valve, operable by the control panel 38, maybe connected to the surge bin 26. The variable speed surge bin auger 30 typically transports solid materials from a point below the surge bin 26 along an inclined path. The flow scale 32 is disposed to accept the flow of solid materials from an elevated portion of the surge bin auger 30. Materials typically flow through the flow scale 32 by gravity. As materials pass through the flow scale 32, the flow scale 32 provides an output to the control panel 38 for indicating various characteristics of the solid material flow. After the solid material flow passes through the flow scale 32, materials are transported by the mix auger 34 to the mix storage bin 36.

Output from the flow scale 32 is transmitted to the control panel 38, which can incorporate any number of suitable display and control features, as desired by the particular application and materials involved. For example, an embodiment of the control panel 38 shown in FIG. 1 indicates a flow rate in tons per hour (TPH) of dust, with a deviation set point percentage, as well as a total mix flow rate (in TPH). The set point is adjustable such that a variation in material flow rates different than a desired percentage will trigger a proportional control action to counter the deviation from the set point (i.e., the changing flow rate). In further embodiments, other features are incorporated into the control panel 38.

The dust flow system illustrated in FIG. 1 is an exemplary configuration only. One or more dust flow scales may be utilized with nearly any type of solid material flow system.

Figure 2:
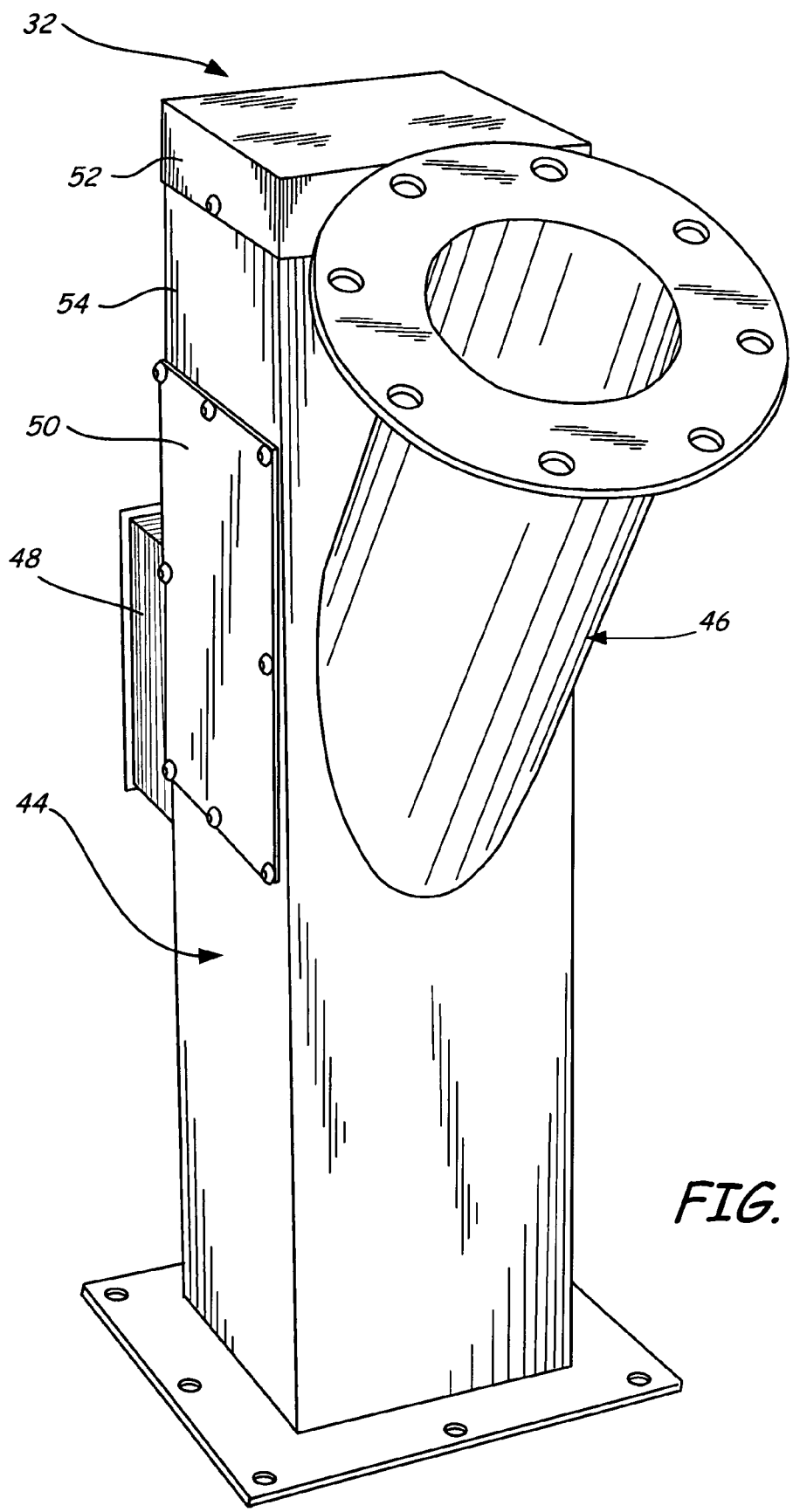
FIG. 2 is a perspective view of the flow scale.

FIG. 2 is a perspective view of the dust flow scale 32. As seen in FIG. 2, the flow scale 32 includes an access panel 50 and a cover 52.

The access panel 50 is removably attached to a side portion of the first tube 44. The access panel 50 is positioned such that the access panel 50 is generally aligned with the housing 48 in a vertical direction. The cover 52 is positioned at an upper end 54 of the first tube 44. The cover 52 is of a shape suitable to match the shape of the first tube 44, as well to accommodate components located at or near the upper end 54 of the first tube 44. Both the access panel 50 and the cover 52 are removable for providing access to interior portions of the first tube 44. In addition, the access panel 50 and cover 52 prevent escape of materials from inside the first tube 44.

Figure 3:
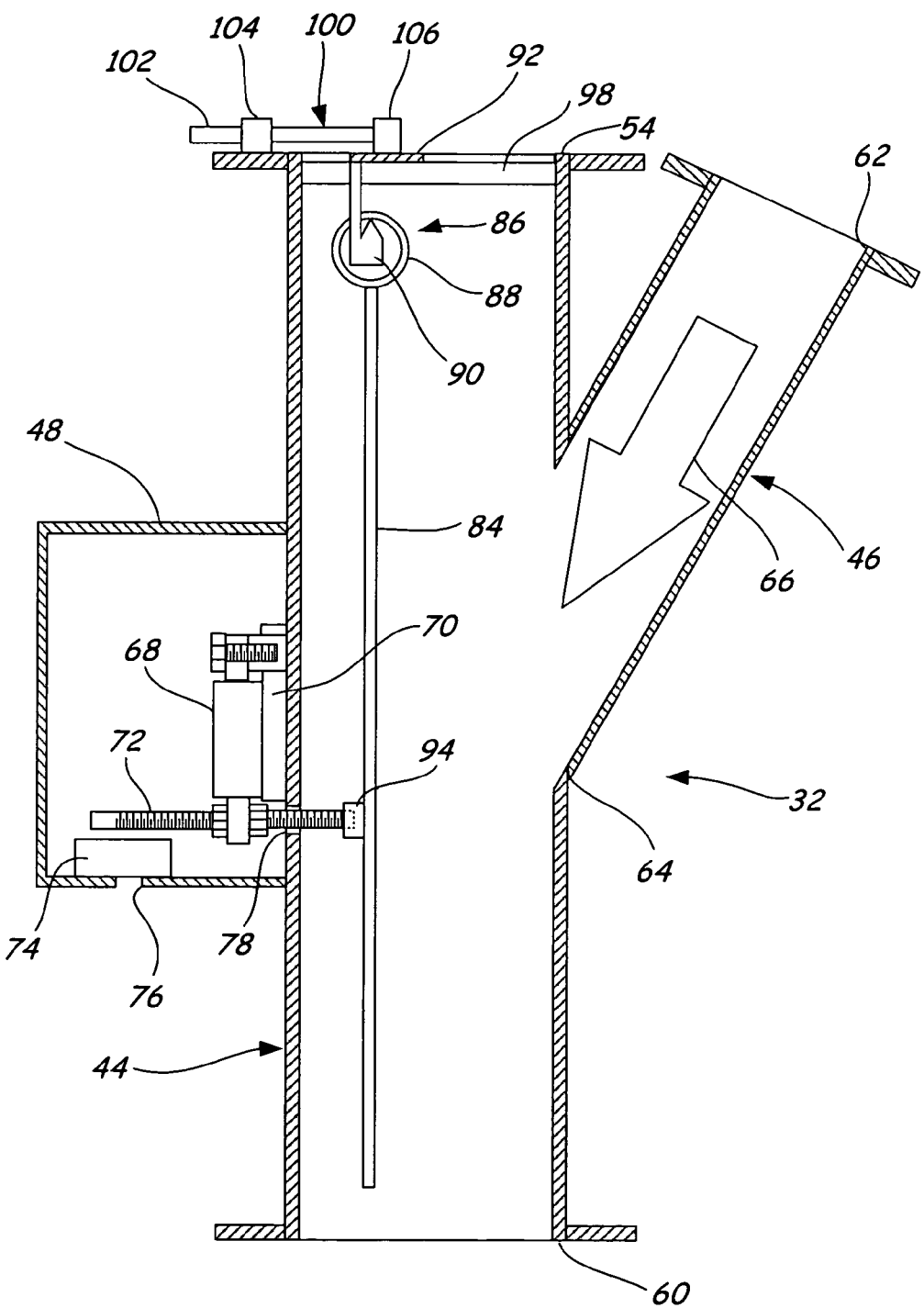
FIG. 3 is a cross sectional view of the flow scale.

FIG. 3 is a simplified cross sectional view of the flow scale 32. The flow scale 32 includes the first tube 44 having a lower end 60 opposite an upper end 54. The second tube 46 has an upper end 62 and an opposite lower end 64. A material flow path 66 is defined through the second tube 46 and into the first tube 44, in a generally downward direction. A sensor 68 is mounted inside the housing 48 on an insulator 70. An elongate member 72 is attached to the sensor 68, an air flow device 74 is disposed inside housing 48 in fluid communication with a port 76. An opening 78 is further defined between the first tube 44 and the housing 48. An impact plate 84 is positioned generally vertically within the first tube 44. Flow scale 32 further includes a hinge assembly 86 including a tubular hanger 88, a support member 90, and a support plate 92. A track 98 is provided at or near upper end 54 of the first tube 44. An adjustment assembly 100 is included, having an adjustment member 102 and first and second support lugs 104 and 106.

The impact plate 84 is typically of a rectangular shape. The size and thickness of the impact plate 84 is selected according to the application with which is will be used. In further embodiments, the impact plate may be removable for installing a different impact plate.

The sensor 68 is typically a load cell. Load cell 68 is mounted substantially parallel to the first tube 44. The elongate member 72 is operable connected to the load cell 68. The elongate member extends through the opening 78 and into the first tube 44. The opening 78 between the first tube 44 and the housing 48 is sufficiently large for the elongate member 72 to extend through the opening 78 without contacting either the first tube 44 or the housing 48. The elongate member 72 is typically adjustable and may be operatively secured to the load cell 68. For example, the elongate member 72 may be threaded, for permitting adjustment of how far the elongate member 72 extends into the first tube 44.

Instruments such as flow scales have a particular accuracy specification associated with them. Normally, these instruments have size characteristics (i.e. a maximum and a minimum flow capacity ratings), where the maximum rating reflects maximum and minimum measurements that the instrument can measure accurately. Another part of the instrument's specification is accuracy as a percent of reading (not percent of full scale). A turn down ratio is the ratio of the maximum flow capacity to the minimum flow capacity while still meeting the accuracy specification. Positioning of the impact plate 84 varies a maximum amount of material that may be measured through the flow scale 32. The impact plate 84 is positioned into the material flow path 66 as much as possible without damming (i.e., substantially impeding) the flow of material. A plate position (i.e. the variable maximum flow capacity) of the flow scale 32 is selected based upon parameters associated with particular applications, permitting very great accuracy at nearly any flow rate.

The air flow device 74 permits control of some environmental conditions within the housing 48. The air flow device 74 allows purging of air inside the housing 48. Because opening 78 may allow hot and corrosive gasses to enter the housing 48, the air flow device 74 allows cooler and less contaminated air to displace the undesired hot and corrosive gasses, as well as airborne process dust. Air is exchanged in and out of the housing 48 through the port 76. In further embodiments, additional ports may be provided. The air flow device 74 allows an air curtain to be formed between the housing 48 and the first tube 44. The air curtain resembles a barrier, formed at or near the opening 78, that limits the possibility of gasses and materials from the first tube 44 entering the housing 48. In a further embodiment, an external compressed air source (not shown) is connected to the air flow device 74 for providing air to the housing 48.

The insulator 70 is a thermal barrier disposed between the load cell 68 and thermally conductive materials, such as the housing 48 or the first tube 44. In a preferred embodiment, the insulator 70 is a rigid fabricated polyimide fiberboard, such as 0.25 inch thick PYROPEL MD-60, manufactured by Jaco Products, Middlefield, Ohio. The insulator 70 reduces heat transmission (i.e., by conduction) to the heat-sensitive sensor 68 for increasing performance of the flow scale 32.

In a preferred embodiment, damping and/or insulating means 94 is operatively engaged between the impact plate 84 and the elongate member 72. In the embodiment shown in FIG. 3, the dampening and insulating means comprises a rubber tube 94 operatively connected to the elongate member 72 and positioned so the impact plate 84 contacts the rubber tube 94 but does not directly contact the elongate member 72. The elongate member 72 is positioned in operative engagement with the impact plate 84 so as to keep sufficient biasing force on the elongate member 72 such that mechanical vibrations and shocks are dampened (i.e., the positive and negative impact of the vibrations and shocks on the sensor 68 are canceled out). The rubber tube 94 transfers impact forces from the impact plate 84 to the elongate member 72. Use of a dampening means such as the rubber tube 94 reduces a risk of the impact plate 84 "bouncing off" of the elongate member 72 or otherwise becoming disengaged from the elongate member 72 during operation.

When measuring hot material flows, some heat from the material flow would ordinarily be transmitted to the impact plate 84 and, in turn, to the load cell 68 via the elongate member 72. The rubber tube 94 acts as an insulating means to, minimize heat transfer to the elongate member 72. In one embodiment shown in FIG. 3, the rubber tube 94 attaches to elongate member 72 and rests against the impact plate 84. This rubber insulates most of the heat that would be conducted from the impact plate 84 to the load cell 68.

The first and second tubes 44 and 46 may be constructed of any suitable metal, preferably tempered carbon steel. The impact plate 84 may also be constructed of tempered carbon steel. Overall dimensions of the flow scale 32 can vary according to the material flow systems with which the flow scale 32 is used. Dimensions of the impact plate 84 are typically adjusted to suit interior dimensions of the first tube 44.

The flow scale 32 permits a number of adjustments, for optimizing operation of the flow scale 32 according to particular characteristics of the materials and flows involved. Adjustments and calibrations are typically performed prior to use of the flow scale 32 in measuring flows.

In a preferred embodiment, the impact plate 84 is adjustable for positioning the impact plate 84 at various distances relative the lower end 64 of the second tube 46. By adjusting a position of the impact plate 84 relative the second tube 46, the impact plate 84 can be positioned in or along the material flow path 66 such that desired contact occurs between the impact plate 84 and fluent materials traveling along the material flow path 66. The desired position of the impact plate will vary according to particular characteristics of the flows measured (e.g., maximum flow rates and mass of the fluent materials). Generally, the impact plate 84 is positioned substantially perpendicular to the material flow path 66 in a lateral direction. The impact plate 84 may be readjusted and locked to facilitate use of the flow scale 32 in different subsequent applications. Adjustment of positioning of the impact plate 84 allows increased accuracy of flow measurements. The elongate member 72 is typically biased while operatively engaged with the impact plate 84. The elongate member 72 is adjusted to extend into the first tube 44 of the flow scale 32 a sufficient distance so that elongate member 72 is biased to about 2 to about 10 percent of the of the maximum flow capacity of the load cell 68. Where the elongate member 72 is sufficiently biased in operative engagement with the impact plate 84, the impact plate 84 generally depends downward at a slight angle, which is responsible for creating a biasing force that acts upon the elongate member 72. Any reading in the sensor 68 resultant from default biasing of the elongate member 72 is generally predictable, and can be reliably accommodated for in determining flow characteristics.

In operation, fluent solid materials, such as seeds, dust, lime, cement, mineral filler, cellulose fiber, and other miscellaneous powders, travel along the material flow path 66. Materials enter the upper end 62 of the second tube 46, the travel to the first tube 44 and eventually out of the lower end 60 of the first tube 44.

As materials traveling along the material flow path 66 come into contact with the impact plate 84, a force is exerted upon the impact plate 84. The hinge assembly 86 permits generally horizontal movement of the impact plate 84 (i.e., hinged movement of the impact plate 84 along an arcuate path) according to the force applied. A horizontal component of the force exerted upon the impact plate 84 is translated into a substantially horizontal force acting upon the elongate member 72, which is operatively engaged with the impact plate 84. The substantially horizontal force acting upon the elongate member is detectable by the sensor 68. In one embodiment, the sensor is a load cell. The load cell 68 is capable of sensing forces acting upon the impact plate 84, due to movement of fluent materials along the material flow path 66, by measuring the force exerted upon the elongate member 72, due to deflection of the impact plate 84. Typically, the flow of materials along the material flow path 66 is measured by detecting the change in voltage across the load cell 68.

Data detected by the sensor 68 can be processed by circuitry (e.g., circuitry included with the control panel 38 of FIG. 1) of a type obvious to those skilled in the art. For example, electronic load cell filtering is typically provided in embodiments where the sensor 68 is a load cell.

Linearity in detection of forces generated by material flows with the sensor 68 is desirable, for repeatedly producing accurate results over time. Better linearity is achieved by configuring the flow scale 32 such that forces detected by the sensor 68, transmitted from the impact plate through the elongate member 72, are substantially horizontal, a opposed to being applied to the sensor 68 as torque.

Figure 4:
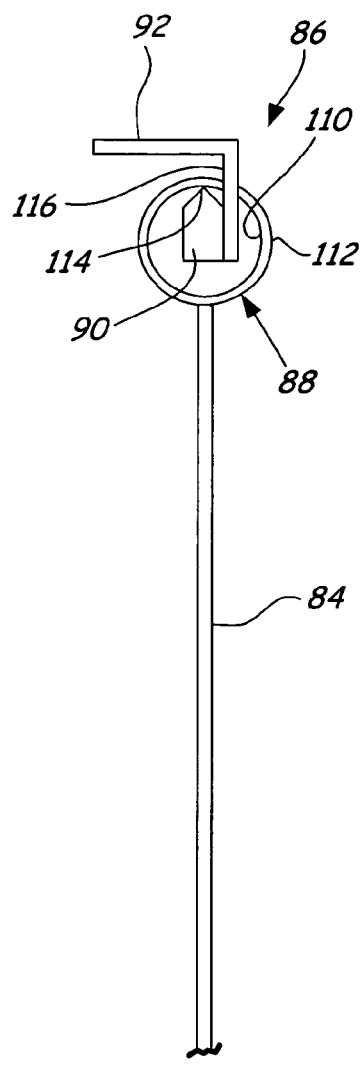
FIG. 4 is a side view of a hinge assembly.
Figure 4A:
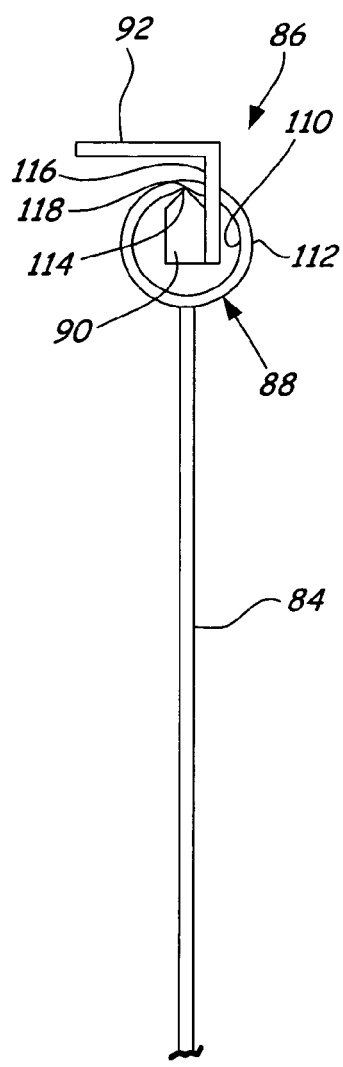
FIG. 4A is a side view of another embodiment of a hinge assembly.
Figure 4B:
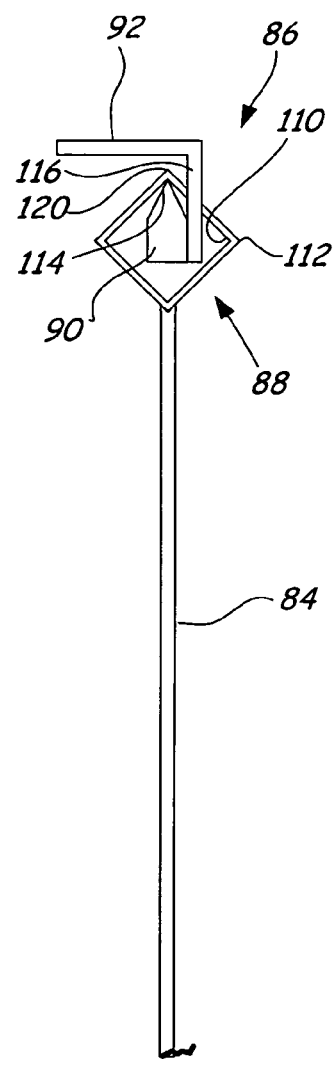
FIG. 4B is a side view of another embodiment of a hinge assembly.

FIGS. 4, 4A and 4B are side views of embodiments of the hinge assembly 86. As seen in a first embodiment illustrated in FIG. 4, the tubular hanger 88 has an interior surface 110 and an exterior surface 112. A vertical portion is attached to the support member 90 and the support plate 92. The support member 90 further includes a blade-like portion 114, disposed to point generally upwards. A vertical portion 116 is included for connecting support member 90 and support plate 92. In a preferred embodiment, the tubular hanger 88 is cylindrical and circular in cross-section, and the interior surface 110 of the tubular hanger 88 is substantially smooth. The hinge assembly of FIG. 4 will generally exhibit a "sweet spot", where the blade-like portion 114 is suitably aligned with respect to an engagement zone on the interior surface 110 of the tubular hanger 88 (i.e., where the blade-like portion 114 contacts the tubular hanger 88). Location of the engagement zone on the interior surface 100 of the tubular hanger will vary, and calibration of the flow scale 32 prior to operation will generally include initial adjustments that will largely determine the location of the engagement zone.

In another embodiment illustrated in FIG. 4A, the tubular hanger 88 is circular in cross-section and has a seating notch 118 to accept the blade-like portion 114. The seating notch 118 is generally relatively wide as compared to the blade-like portion 114. In another embodiment shown in FIG. 4B, the tubular hanger 88 is rectangular, and preferably square, with the blade-like portion 114 disposed to rest at a right angle portion 120 of the tubular hanger 88. In still further embodiments, the tubular hanger 88 may have other shapes.

Typically, a hanger tube like that show in FIG. 4, with a smooth interior surface, is used in applications where material build up in the mechanical support is problematic. In applications where shock and other mechanical jarring may cause hanger-pipe-to-blade-portion misalignment, a notched or a square hanger tube, such as those shown in FIGS. 4A and 4B, can be used, to facilitate natural self-alignment of the blade-like portion with respect to the hanger tube by urging engagement of the blade-like portion 114 with a particular portion of the interior surface 100 of the tubular hanger 88.

Figure 5:
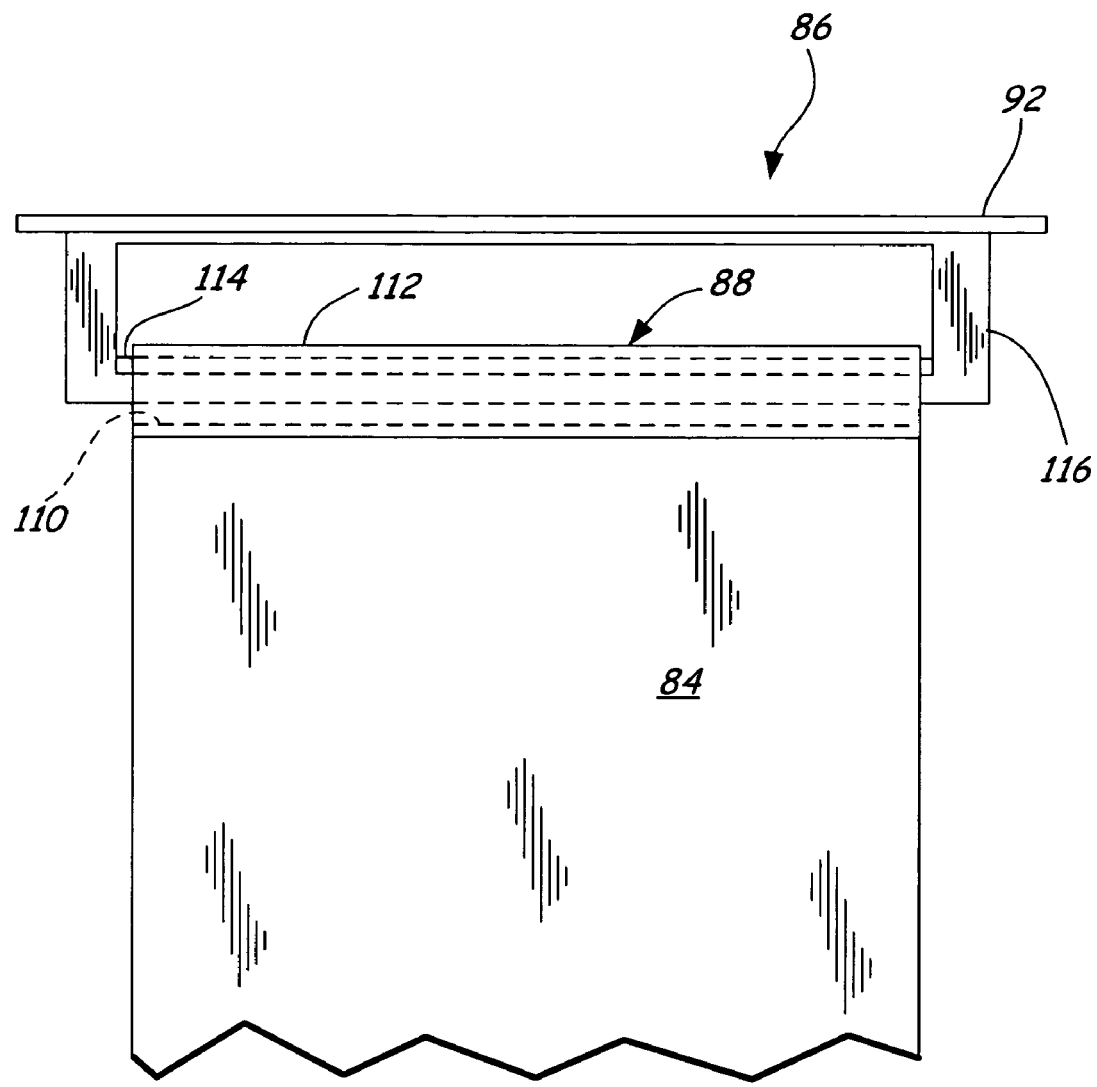
FIG. 5 is a front view of the hinge assembly of FIG. 4.

FIG. 5 is a front view of the hinge assembly 86 of FIG. 4. The blade-like portion 114 extends in a substantially horizontal direction and supports the tubular hanger 88.

As seen in FIGS. 4–5, the blade-like portion 114 supports the impact plate 84, which hangs downward in a generally vertical orientation. The hinge assembly 86 imposes near zero resistance to mechanical hinge action. The blade-like portion 114 provides low hysterisis support with respect to horizontal movement of the impact plate 84 (i.e., it is nearly mechanical resistance free). When flow scale 32 is in operation, fluent solid materials traveling along the material flow path 66 exert only a small force against the impact plate 84; however, the low mechanical resistance of the hinge assembly 86 permits the impact plate 84 move in an arc (i.e., a small horizontal movement) of only a few thousandths of an inch according to such small forces.

Figure 6:
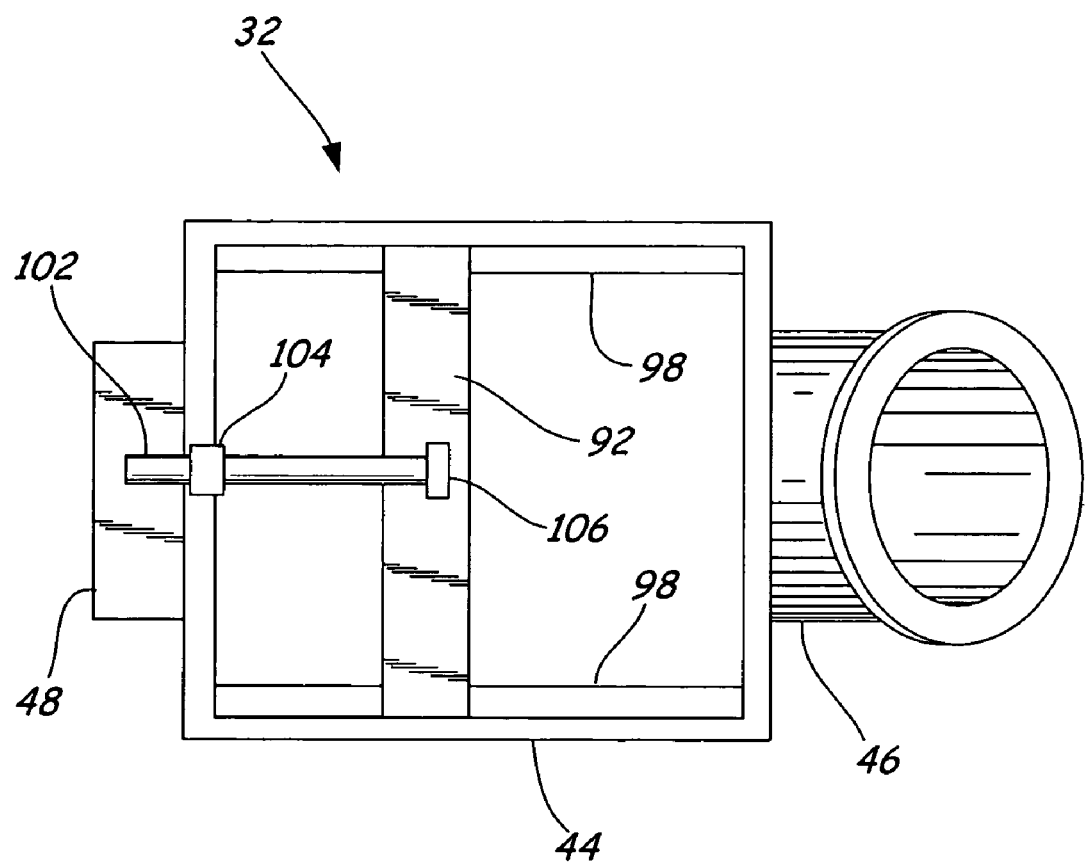
FIG. 6 is a top view of the flow scale.

FIG. 6 is a top view of the 32. As seen in FIG. 6, the track 98 provides support to the support plate 92 on opposing sides of the first tube 44. The support plate 92 may be adjusted by sliding the support plate 92 along the track 98, by moving the support plate 92 closer or further away from the second tube 46.

The first an second support lugs 104 and 106 allow engagement of the support member 102 with the first tube 44 and the support plate 92, respectively. The first support lug is fixedly attached to the first tube and the second support lug is fixedly attached to the support plate 92. Adjustment of the adjustment member 102 allows a distance between the first and second support lugs 104 and 106 to be changed, thereby positioning the support plate (which supports the impact plate 84) at a desired distance relative to the second tube 46. In one embodiment, the adjustment member 102 and the first and second support lugs 104 and 106 are threaded, allowing positioning of the support plate 92 with commonly available tools. Because the impact plate 84 is supported by the hinge assembly 86, adjustment of the support plate 92 allows positioning of the impact plate 94 at a desired distance relative to the second tube 46.

Although the present invention has been described with reference to preferred embodiments, workers skilled in the art will recognize that changes may be made in form and detail without departing from the spirit and scope of the invention.

The invention claimed is:

1. An impact flow scale comprising:
   a first tube, disposed substantially vertically;
   a second tube, disposed with a downward inclination and having an inlet at an upper end thereof and a lower end of the second tube connected to the first tube, wherein the first and second tubes permit material communication therebetween;
   an impact plate;
   mounting means including a blade-like portion for hingedly suspending the impact plate at or near an upper end of the first tube such that the impact plate extends within the first tube;
   a material flow path defined from the second tube through the first tube, wherein the impact plate is adjustably positioned in the material flow path such that materials moving along the material flow path are capable of contacting the impact plate; and
   sensing means disposed outside the first tube, the sensing means being operably connected to the impact plate thus permitting detection of a horizontal force component generated as materials move along the material flow path.

2. The impact flow scale of claim 1 wherein the sensing means includes a load cell and a substantially horizontal elongate member, wherein the elongate member is operably connected to the load cell and extends into the first tube, and wherein the elongate member does not contact the first tube, thus allowing the impact plate to operatively engage the elongate member.

3. The impact flow scale of claim 2 wherein a thermal insulator is disposed between the load cell and the first tube.

4. The impact flow scale of claim 2 wherein the elongate member is thermally insulated from the impact plate.

5. The impact flow scale of claim 2 and further comprising dampening means operably connected to the elongate member for maintaining operative engagement of the impact plate and the elongate member.

6. The impact flow scale of claim 1 wherein the mounting means comprises:
   a tubular cylindrical member attached to a first end of the impact plate, wherein the tubular cylindrical member has a substantially smooth interior surface;
   a support member extending inside the tubular cylindrical member, wherein the support member has the blade-like portion arranged to point generally upward, and wherein the blade-like portion of the support member is capable of engaging the interior surface of the tubular cylindrical member for hingedly supporting the impact plate.

7. The impact flow scale of claim 1 wherein the mounting means comprises:
   a tubular member attached to a first end of the impact plate, wherein the tubular member has a notch on an interior surface of the tubular member;
   a support member extending inside the tubular member, wherein the support member has the blade-like portion arranged to point generally upward, and wherein the blade-like portion of the support member is capable of engaging the notch on the tubular member for hingedly supporting the impact plate.

8. The impact flow scale of claim 1 wherein the mounting means comprises:
   a rectangular tubular member attached to a first end of the impact plate, wherein the rectangular tubular member is disposed with a right angle portion of the rectangular tubular member pointing substantially upward;
   a support member extending inside the tubular member, wherein the support member has the blade-like portion arranged to point generally upward, and wherein the blade-like portion of the support member is capable of engaging the right angle portion of the rectangular tubular member for hingedly supporting the impact plate.

9. The impact flow scale of claim 1 and further comprising a sensor housing attached to an exterior of the first tube for housing the sensing means, an opening being defined between the sensor housing and the first tube, and wherein an air curtain is formed between the first tube and the sensor housing.

10. The impact flow scale of claim 1 and further comprising an airflow device for cooling air surrounding the sensing means.

11. The impact flow scale of claim 1 wherein the impact plate is laterally adjustable, for positioning the impact flow plate inside the first tube at various horizontal positions relative to the second tube.

12. The impact flow scale of claim 1 wherein the impact plate is removable, for providing impact plates suitable to a particular material to be sensed.

13. A method of measuring flow characteristics of a flow of solid materials, the method comprising:
   providing a first tube disposed substantially vertically;
   hingedly mounting an impact plate substantially inside the first tube using a low-hysterisis hinge assembly including a blade-like portion, wherein material traveling along a material flow path through the first tube is capable of contacting the impact plate; and
   sensing, with a sensing apparatus, a substantially horizontal component of force applied to the impact plate by the flow of solid materials.

14. The method of claim 13 and further comprising:
   thermally insulating the sensing apparatus from the first tube.

15. The method of claim 13 and further comprising:
   dampening vibration and shock between the impact plate and the sensing apparatus for reducing sensing errors.

16. The method of claim 13 and further comprising:
   generating an air curtain through an opening between the first tube and a sensor housing supported adjacent the first tube.

17. The method of claim 13 and further comprising:
   purging air inside a sensor housing that is supported adjacent the first tube.

18. The method of claim 13 and further comprising:
   providing cool air to a sensor housing that is supported adjacent the first tube.

19. An impact flow scale comprising:
   a first tube, disposed substantially vertically;
   a second tube, disposed with a downward inclination and having an inlet at an upper end thereof and a lower end of the second tube connected to the first tube, wherein the first and second tubes permit material communication therebetween;

an impact plate;

an adjustable hinge assembly for suspending the impact plate at or near an upper end of the first tube such that the impact plate extends within the first tube, the adjustable hinge assembly supporting the mass of the impact plate on a knife-edge disposed substantially horizontally;

a track located at or near an upper end of the first tube, wherein the adjustable hinge assembly slidably engages the track for laterally adjusting hinge and plate for positioning the impact flow plate inside the first tube at various horizontal positions relative to the second tube positions within the first tube;

a material flow path defined from the second tube through the first tube, wherein the impact plate is positioned in the material flow path such that materials moving along the material flow path are capable of contacting the impact plate;

a load cell disposed within a housing attached to an exterior surface of the first tube, wherein an opening extends between the housing and the first tube; and an elongate member operably connected to the load cell, the elongate member disposed substantially horizontally and extending through the opening and into the first tube without contacting either the housing or the first tube, wherein the elongate member is disposed for operative engagement with the impact plate thus permitting detection of a horizontal force component generated as materials move along the material flow path.

20. The impact flow scale of claim 19 wherein the elongate member is thermally insulated from the impact plate.

21. The impact flow scale of claim 19 and further comprising dampening means operably connected to the elongate member for reducing sensing errors from vibration and shock.

22. The impact flow scale of claim 19 and further comprising and airflow device for generating an air curtain between the first tube and the housing.

23. The impact flow scale of claim 19 and further comprising an airflow device for cooling air surrounding the sensing means.

24. The impact flow scale of claim 19 and further comprising a filtering means for electronically filtering signals generated by the sensing means.

25. The impact flow scale of claim 19 wherein the impact plate is removable, for providing impact plates suitable to a particular material to be sensed.

* * * * *

UNITED STATES PATENT AND TRADEMARK OFFICE
CERTIFICATE OF CORRECTION

PATENT NO. : 7,007,557 B1 Page 1 of 1
APPLICATION NO. : 10/854398
DATED : March 7, 2006
INVENTOR(S) : Clarence Richard It is certified that error appears in the above-identified patent and that said Letters Patent is hereby corrected as shown below:

Title page, item [54] and Col. 1, line 1 Title, delete "FLOW", insert --AN IMPACT FLOW--

Column 2, Line 36, delete "maybe", insert --may be--

Column 7, Line 55, delete "has the", insert --has a--

Column 7, Line 67, delete "has the", insert --has a--

Column 8, Line 12, delete "has the", insert --has a--

Signed and Sealed this

Twenty-sixth Day of December, 2006

JON W. DUDAS
*Director of the United States Patent and Trademark Office*